J. McMannus.
Ventilating Hats.
No 927 Fig: 1 Reissued Mar. 13, 1860.
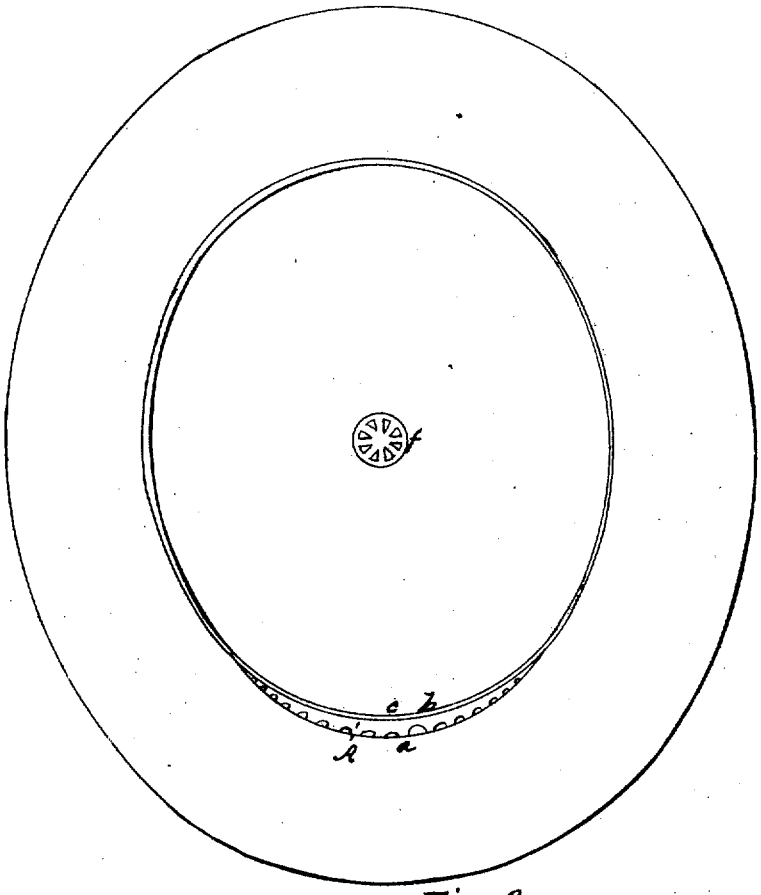
Fig: 2.
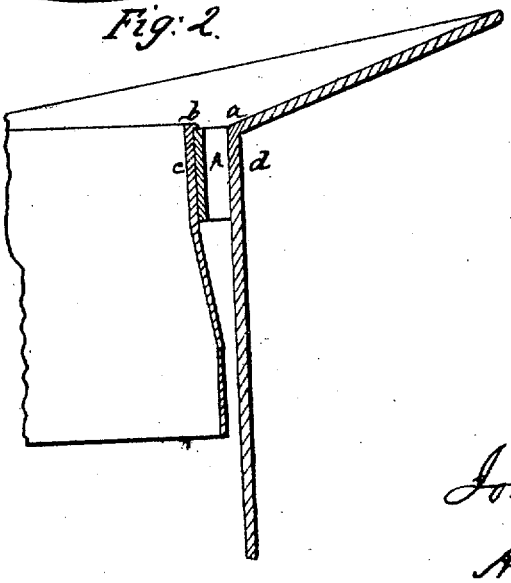
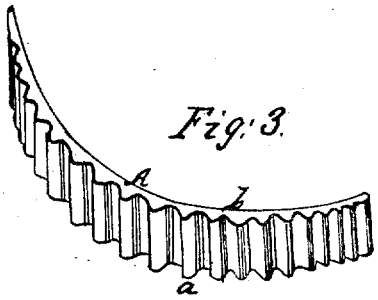
Fig: 3.
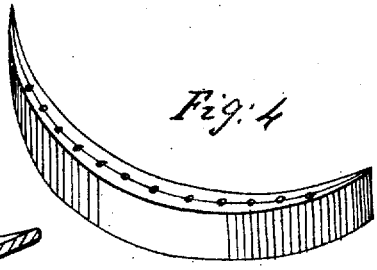
Fig: 4
Inventor
John McMannus
per atty
A.B. Stoughton.

UNITED STATES PATENT OFFICE.

JOHN McMANNUS, OF NEW YORK, N. Y.

IMPROVEMENT IN THE VENTILATORS OF HATS.

Specification forming part of Letters Patent No. 26,692, dated January 3, 1860; Reissue No. 927, dated March 13, 1860.

*To all whom it may concern:*

Be it known that I, JOHN McMANNUS, of the city, county, and State of New York, have invented a certain new and useful Improvement in Self-Ventilating Hats; and I do hereby declare that the following is a full, clear, and exact description of the same, reference being had to the accompanying drawings, in which—

Figure 1 represents the under part of a hat with my improvement attached to it. Fig. 2 represents a section through a portion of the rim, body, sweat-cloth, and ventilator, and Figs. 3 and 4 represent the ventilating piece detached from the hat.

I am aware that ventilating-holes have been made in the sweat-cloth of a hat. These holes get closed up to the air, while they allow the the perspiration to pass through them, and stain or soil the exterior of the hat. I am also aware that corrugated metal pieces have been introduced between the lining and exterior of the hat to make these ventilating-openings. The metal is, of course, impervious to the perspiration, and it will preserve its air spaces; but it is an exceedingly uncomfortable thing to press against the head, and thus fails to come into use.

My object is to make a hat that will ventilate while on the head of the wearer, that will not allow the perspiration to pass through it, that will not close up by the pressure in wearing it, and that will give a smooth bearing-surface for the head, and all these elements I find in the ventilating-strip which I shall hereinafter mention, applied between the sweat-cloth and the exterior of the hat.

To enable others skilled in the art to make and use my invention, I will proceed to describe it with reference to the accompanying drawings.

I take a crescent-shaped piece of prepared rubber, gutta-percha, or prepared paper, which extends around the fore part of a hat, as seen at Fig. 3 (marked A,) one side of which (marked *a*) is made into corrugations, and the other side, *b*, left smooth. This piece A is put into the hat between the sweat-cloth *c* and the body *d* of the hat, the smooth side *b* next the head, and the corrugated side *a* next the hat-body, and thus there is a smooth bearing for the forehead against the ventilating-piece, and the openings through it next the brim cannot, owing to the nature of the material out of which the ventilating-piece A is made, close up. A very good way of making these ventilating-strips is to first mold the piece, as shown at Fig. 4, and afterward divide it, as shown by the red line therein, and thus make two out of it. This makes the holes of Fig. 4 into grooves or corrugations, as shown at Fig. 3, and the piece, Fig. 4, may be used entire, though it is heavier than necessary. I much prefer, however, the plan shown in Fig. 3, as it is much lighter and makes as good a ventilation.

*f* represents the ordinary ventilation in the crown of the hat; but it, with the ventilator A, affords a constant circulation of air through the hat while on the head, the hat being just as comfortable as any other hat, impervious to the perspiration of the forehead, and there being no possibility of the openings being closed up by pressure in wearing.

Having thus fully described the nature of of my invention, I would state that I do not claim holes in a hat sweat-cloth, nor do I claim corrugations simply, nor corrugated metal strips therein; but

What I do claim as new, and desire to secure by Letters Patent, is—

A ventilating-piece having a smooth surface next the head and grooves or openings next the brim, and made of india-rubber, gutta-percha, or prepared paper, and firm enough not to crush or close up said openings, and impervious to perspiration, as herein represented, and for the purpose set forth.

JOHN McMANNUS.

Witnesses:
B. J. PENTZ,
J. J. GILMORE.